Nov. 26, 1929.    P. MINCK    1,737,321
ELASTIC COUPLING
Filed May 28, 1925    2 Sheets-Sheet 1

Inventor
Paul Minck,
By  atty.

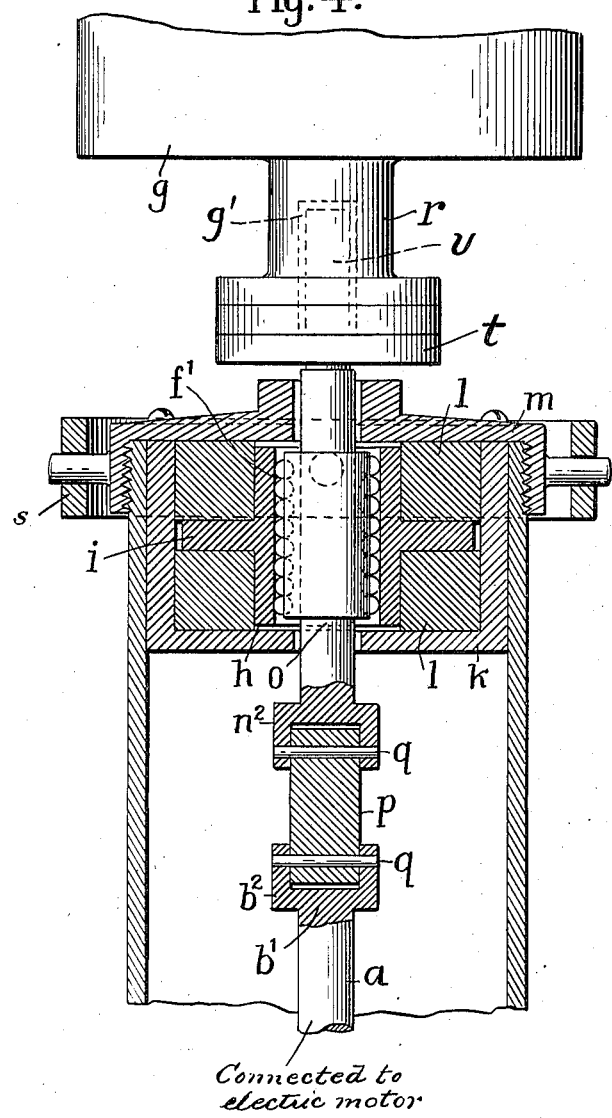

Patented Nov. 26, 1929

1,737,321

UNITED STATES PATENT OFFICE

PAUL MINCK, OF PETERSDORF, GERMANY

ELASTIC COUPLING

Application filed May 28, 1925, Serial No. 33,477, and in Germany June 3, 1924.

This invention has for its object an improved elastic coupling, which is particularly suitable for vertical shafts or spindles running at high speeds, such, for instance, as are found in all kinds of centrifugal apparatus. In particular, the elastic coupling of the present invention is applicable with especial advantage to the spindles of so-called spinning centrifugals such as are usually employed in the artificial silk industry and which have to run at 10,000 revolutions and more per minute, the spindle carrying on its upper end a comparatively heavy spinning pot the steady revolution of which is of paramount importance for reliable spinning.

The present invention is based on the assumption that the vessel with the upper shaft member must always remain vertical, like a top, so as to impart a steady motion to an eccentric vessel. This however is only possible when the lower end of the upper shaft can move readily to and fro on the upper end of the lower shaft, without appreciable or noticeable loss of the parallel relation between the axes of the two shafts or kinking taking place between the flexibly mounted shafts. The usual elastic mounting of the collar bearing by means of end supporting metal springs is not sufficient to take up the lateral displacements of the upper shaft which arise in this arrangement and which take place with enormous rapidity although they are small in amount per se, as the reaction of metal springs is much too sluggish. On the contrary it has been found that the bearings of the upper shaft can only take up the movements which arise therein without friction when they are completely embedded in rubber or some elastic substance of similar properties. In this case quite abnormally eccentric spinning pots, even when loaded to one side, run with a perfectly regular steady movement which has hitherto not been attained in the same degree by any other means.

Figure 1:
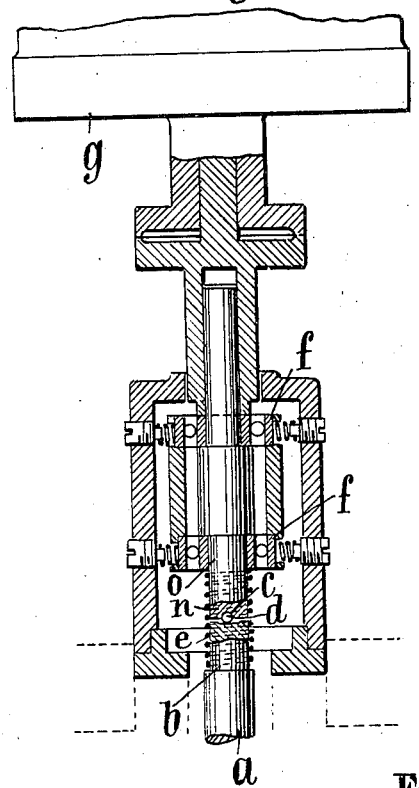
Figure 2:
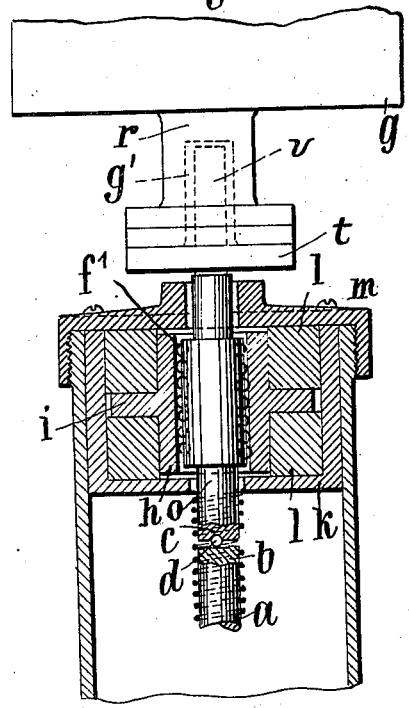
Figure 3:
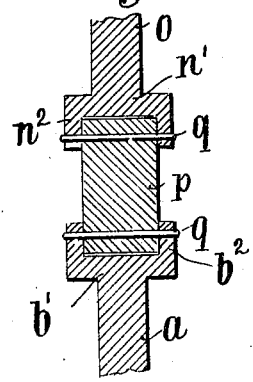

Figure 1 of the accompanying drawings shows, by way of example, one constructional form of the invention in part sectional elevation. Fig. 2 is a vertical section of a modified construction. Fig. 3 shows a modification of the spindle connections. Fig. 4 is a view showing features of Figs. 2 and 3 in one structure. The lower shaft section $a$ of the spinning head is mounted quite rigidly so as not to be displaced laterally and the end $b$ thereof is hollowed out to provide a sunken circular surface, which for a shaft of 20 mm. in diameter will be about 10 mm. In the end $n$ of the upper shaft section $o$ is formed a central seat $c$ for a ball $d$, the diameter of which is preferably about 5 mm. The ends of both shaft sections are connected together by a spiral spring $e$. The upper shaft is carried in two spring-supported collar bearings $f, f$ and the spinning pot $g$ is placed on the top of the upper shaft section. When the pot rotates the spiral spring $e$ contracts so that the upper section $o$ with the spinning vessel is driven by the lower rigidly mounted driving section $a$, while the upper section can move to and fro in accordance with the eccentric rotation of the spinning pot though maintaining an accurate vertical direction by means of the ball which supports it centrally on the circular surface in the head of the lower shaft. During this rotation the spiral spring, as well as the spring supported collar bearing, continually follows the accurately horizontal movements of the upper shaft.

In Figure 2 is shown a specially constructed mounting of the yielding collar bearing for the upper shaft section. The shaft is carried in this case by a ball bearing $f^1$ which is made especially long. The ball bearing runs in a bearing sleeve $h$ which is provided with an external flange $i$. Above and below the flange $i$, and tightly surrounding the ball bearing sleeve $h$, are the two heavy rubber rings $l, l$, which, in their turn, are held in position by the bearing sleeve $k$ and the cover $m$. The ball bearing sleeve $h$ is in this case not elastically supported at certain points only by a series of spiral springs as has hitherto been usual, but is inclosed along its entire external surface in an elastic material. In this way it is possible, in conjunction with the new method of connection for the ends of the shaft sections, above described, to ensure the oscillating masses, which rotate at very high speed, of equalizing their eccentrically acting centrifugal forces similar to a freely running gyroscope and acquire an absolutely smooth and perfectly unicentric motion. The whole centrifugal may with advantage be suspended in a Cardan ring $s$, which takes up the eccentric oscillations which are set up when the centrifugal is started and before the gyroscopic effect has come into play.

The extraordinarily good result obtained by mounting the collar bearing of the upper shaft in rubber, instead of employing the usual metal springs for the purpose, led to attempts being made to use the same material for the connection of the upper and lower shaft sections of the divided shaft and in this way to obtain the same action as with the new coupling apparatus above described namely to render it possible for the upper yieldingly mounted shaft section $o$ which carries the spinning vessel to move, whilst rotating on its axis, relatively to the lower rigidly mounted shaft section $a$ without noticeably losing its parallel relation to this latter.

For the construction of a vertically mounted spindle revolving at several thousands of revolutions per minute and carrying, on its upper end, a spinning pot weighing about 3 kg., entirely new conditions arise.

Firstly, this spinning pot must be capable of being removed for working purposes, so that the oscillating masses must absolutely be located above the top bearing of the driving spindle. For this reason, the usual suspension of the revolving parts used in centrifugals running at a high speed and in which the parts are supported on a combined thrust and collar bearing, the revolving weight masses all remaining below the point of suspension, is in the present case impossible.

Secondly, it must always be taken into account that the spinning pots themselves are generally more or less eccentric, since even if they are substantially balanced and concentric when first installed, they soon acquire false centres of gravity, owing to the unavoidable mechanical and chemical effects arising in the driving and working of the apparatus. Moreover the number of revolutions per minute at which the spinning pot has to revolve must be at least 5000 in order to obtain satisfactorily the requisite degree of twist in the spun thread. A new problem has therefore been presented to science, which it has not yet been possible to solve completely by the appliances hitherto known and constructed for the purpose. All these expedients, however have been found to be useless, as they are situated too far away from the spindle which, in particular, has to absorb into itself all eccentric centrifugal forces.

It could not be foreseen that this difficult problem could be solved by coupling the divided spindle by means of caoutchouc or vulcanized rubber or by mounting the collar bearing in this material, as such substance would have appeared to be much too rigid by comparison with the functioning of fine metal springs. Numerous experiments have, however, now shown that the eccentric centrifugal forces which arise at the required number of revolutions per minutes (namely 5000 and upwards) are resolved into so many multiple and strongly acting divided impulses that any metallic elastic system would be too sluggish to absorb them, while, on the other hand, rubber or other equivalent elastic material possesses, under the conditions above named, the property of being able to absorb these powerful and innumerable divided impulses completely though only when these impulses can be taken up directly at the point of their inception, that is to say, when the elastic material is placed in direct contact with the driving shafts.

Reasoning from this standpoint, it became possible to find a coupling for the divided ends of the two shafts, the elastic material used for connecting them constituting, both the means for transmitting the driving power and the support of the upper shaft which carries the spinning vessel. Even when the connection between the ends of the shafts is made by means of this material, care must be taken in their arrangement that the eccentric impulses which arise are absorbed not only in a horizontal direction but also in a vertical one and in all other directions of relative movement or potential movement between the shafts.

By means of the new coupling, when correctly applied, it is now possible to employ as high a speed for the spinning centrifuge as may be desired and at the same time to obtain notwithstanding the use of a very eccentric spinning pot, perfectly steady and unicentric rotation of the said spinning vessel, as is necessary for the success of the spinning process. An increase in the number of revolutions per minute to twice that hitherto attained (or even more) constitutes a most important technical advance, since the speed of spinning and the twist of the thread can be increased to any desired degree.

That principle of the invention which enables the divided shafts to move axially, without practically losing parallelism as between their axes, is also retained in the new coupling, inasmuch as the gyroscopic coefficient of inertia of the upper shaft, carrying the heavy spinning pot and rotating at such a high speed is powerful enough and the elastic element mounted between the two shafts is flexible enough to allow of the latter compensating any relative displacement between the axes of the two shafts, while permitting the upper shaft to retain its true plane of rotation. The length and diameter of the elastic element made of rubber, or the like, must naturally be proportioned according to the ratios of the forces which arise, in a manner suitable to each particular case.

Figure 3 of the drawings shows by way of example, a preferred construction of this modified form of coupling, which is suitable for a speed of rotation of about 10,000 revolutions per minute. The lower rigidly mounted shaft $a$ carries on its upper end $b^1$ a dished or cup-shaped enlargement $b^2$. The upper elastically mounted shaft $o$ is provided with a similar enlargement $n^2$ on its lower end $n^1$. Between the two enlarged portions, and fitting into them, is inserted a cylindrical piece of caoutchouc, that is to say, vulcanized rubber $p$ about 30 m/m in diameter and 50 m/m in length, which is secured in position by the pins $q$ engaged in the edges of the enlarged portions $b^2$ and $n^2$. With these dimensions a perfectly elastic coupling of the two shafts is obtained and such coupling, while capable of taking up all eccentric shocks, is yet sufficiently stable to carry the upper shaft with the spinning pot. The driven shaft $o$ carries at its top a friction plate $t$ from which projects a pin $v$ considerably smaller in diameter than the recess $g'$ in the neck $r$ of the spinning pot.

What I claim is:—

1. A spinning centrifugal, comprising the combination with a lower vertical spindle and means for rotating it; of a normally alined upper spindle, a spinning pot on the upper end of the upper spindle and means connecting the alined spindles permitting lateral displacement of the upper spindle with respect to the lower spindle without any practical loss of parallelism between the axes of the spindles.

2. A spinning centrifugal, comprising in combination a lower vertical driving spindle, a normally alined upper spindle above the lower spindle, a spinning pot carried by the upper spindle, resilient journal means for the upper spindle permitting lateral displacement of the upper spindle with respect to the lower spindle, and an elastic connection between the spindles constituting a yielding, supporting and driving coupling for the upper spindle.

3. A spinning centrifugal comprising in combination, a lower, vertical driving spindle, a coupling member seat at its upper extremity, a vertical upper spindle, a coupling member seat at its lower extremity, a coupling and supporting element of elastic material inserted between the seats of said spindles with its ends engaging said seats, relative rotation between the elastic member and its seats being prevented, a journal bearing for said upper spindle and resilient journal supporting means permitting said journal and upper spindle to move laterally.

4. A spinning centrifugal, comprising a casing, a vertical driving spindle therein, a driven spindle also in the casing, an elastic coupling positively connecting the upper end of the driving spindle and the lower end of the driven spindle to permit lateral displacement of the axis of the upper spindle with respect to the axis of the lower spindle.

5. A spinning centrifugal, comprising a cylindrical casing, a vertical driving spindle therein, a driven spindle, a piece of elastic material connecting the spindles to permit lateral displacement of the driven spindle, a spinning pot carried by the driven spindle, a journal bearing for the driven spindle and rings of elastic material interposed between the bearing and casing.

6. A spinning centrifugal, comprising a casing, a driving spindle journalled in said casing, a driven spindle elastically journalled in said casing for substantially parallel lateral displacement in relation to said driving spindle, yieldable spacing and coupling means connecting the opposing ends of said spindles, a spininng pot carried by said driven spindle and Cardan suspension means embracing said casing.

7. A spinning head comprising a casing supported to swing, a rubber bearing mounted in said casing, a spindle carried in said bearing and projecting from said casing, a motor shaft co-axial with said spindle, a flexible member connecting said shaft and spindle, a head having a frictional surface upon said spindle outside said casing, and a cylindrical stem projecting from said surface.

8. Apparatus for spinning artificial silk, comprising a thread can, a driving shaft therefor formed in two parts, and a flexible member joining said parts thereby to permit relative lateral movement without substantial loss of parallelism between said parts.

9. In a spinning head, the combination of a casing, a shaft supported therein in bearings, a second shaft substantially co-axial with the first, and a flexible member connecting said shafts to transmit the drive between them and to permit relative lateral movement without substantial loss of parallelism of said shafts.

10. In a spinning head, the combination with the driven shaft; of a ball bearing comprising a plurality of series of balls supporting said shaft, a sleeve surrounding the said balls and having a circumferential flange, a casing surrounding said shaft, and rubber rings supported endwise and radially in said casing fitting said sleeve on opposite sides of its flange.

11. A spinning head comprising the combination with a lower vertical spindle section and means for rotating the same; of an upper vertical spindle section carried on the upper end of said lower vertical section, means for transmitting rotary movement from said lower section to said upper section and means in connection with the aforesaid means permitting lateral displacement of said upper section in relation to said lower section practically without loss of parallelism between the axes of said spindles.

In testimony whereof I have signed my name to this specification.

PAUL MINCK.